Dec. 25, 1951     J. D. CALHOUN     2,579,901
LOG TURNER AND DECK BLOCK FOR SAWMILLS
Filed Nov. 1, 1946     2 SHEETS—SHEET 1

Inventor
James D. Calhoun
Attorneys

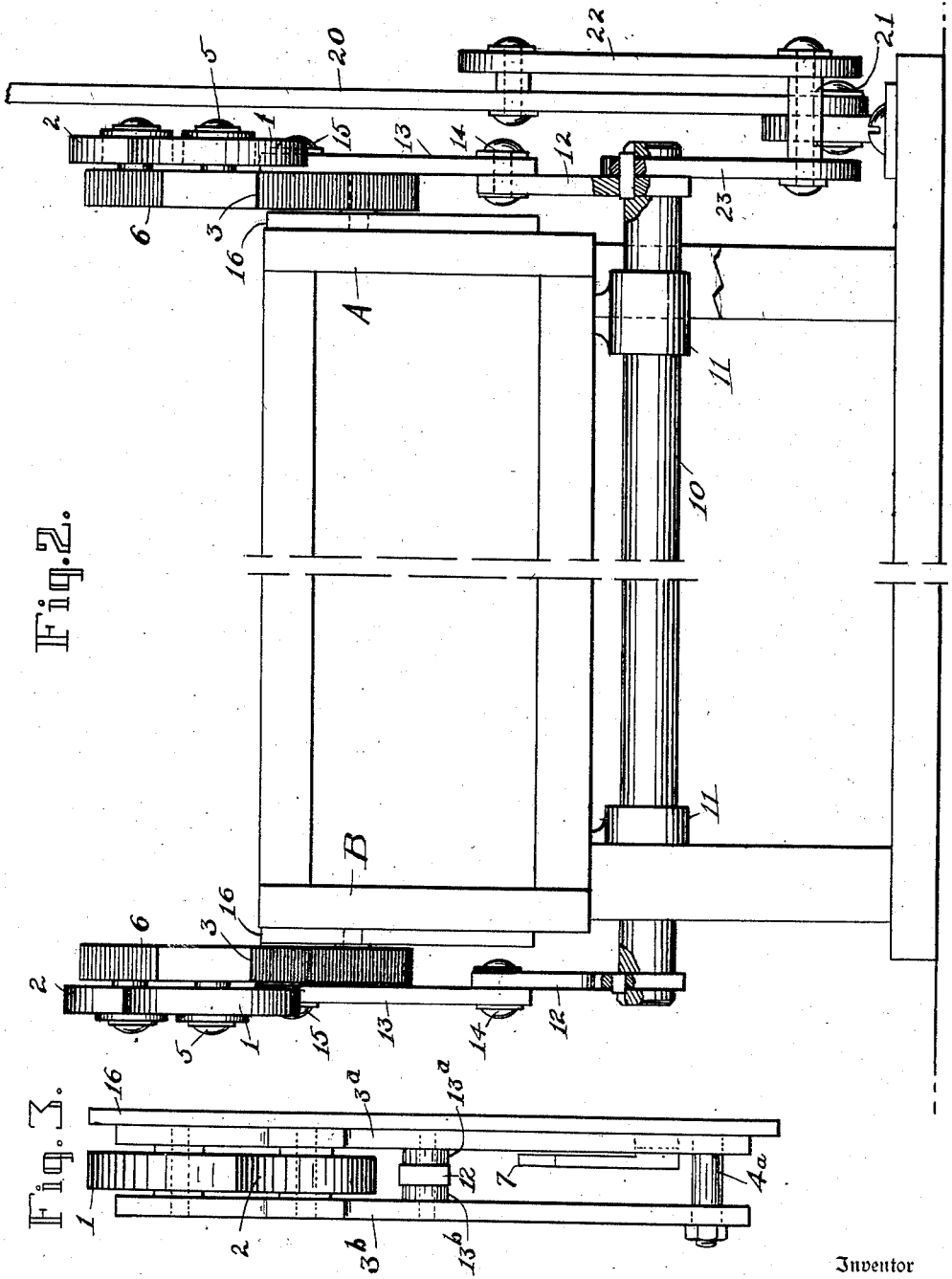

Patented Dec. 25, 1951

2,579,901

UNITED STATES PATENT OFFICE 2,579,901

LOG TURNER AND DECK BLOCK FOR SAWMILLS

James D. Calhoun, West Monroe, La.

Application November 1, 1946, Serial No. 707,235

2 Claims. (Cl. 143—95)

My present invention relates to a device to be used in conjunction with the skid ways comprising the so-called log deck of a saw mill on which logs are supported for successive presentation to the carriage block which reciprocates with reference to the saw which reduces the logs by successive passes or cuts into pieces of lumber of the desired size.

My invention has for its object to provide an instrumentality located with reference to the breast or discharge end of the log deck which may be manipulated by the sawyer to advance or roll the foremost log from the deck onto the carriage block in the first instance and which may subsequently be operated by the sawyer to turn a partially trimmed log, or the timber shaped therefrom, and return it to said carriage in a new position for a further trimming or sawing operation.

A further object of my invention is to provide a pair of rollers in staggered relation which move upwardly above the log deck, the first one engaging a log to roll it forwardly into the path of the second which in turn continues the forward rolling movement of the log onto the reciprocating saw table.

Another object of my invention resides in the arrangement of two rollers of unequal diameter, the smaller one being located above and in rear of the larger one in overlapping relation thereto and placing thereon with relation to the breast of the deck so that as they are elevated they will successively engage a log to cause its uninterrupted forward travel from the deck onto the reciprocating carriage block.

A still further object of the invention is the arrangement of two or more of the forementioned staggered rollers in spaced alinement at opposite sides, or otherwise with reference to the skid ways, of the log deck and provide them with interconnecting toggles capable of being manipulated by a common operating lever under the control of the sawyer.

To these and other ends my invention comprehends further improvements and arrangements of parts all as will be fully described in the accompanying specification, the novel features thereof being set forth in the appended claims.

In the drawings:

Figure 2 is a front elevation looking in the direction indicated by the arrows on the line $2^x$—$2^x$ of Fig. 1.

Figure 3 is a detail view showing how the rollers may be carried between two parallel arms in lieu of the single arms shown in Figs. 1 and 2.

Similar reference characters in the several figures indicate similar parts.

Figure 1:
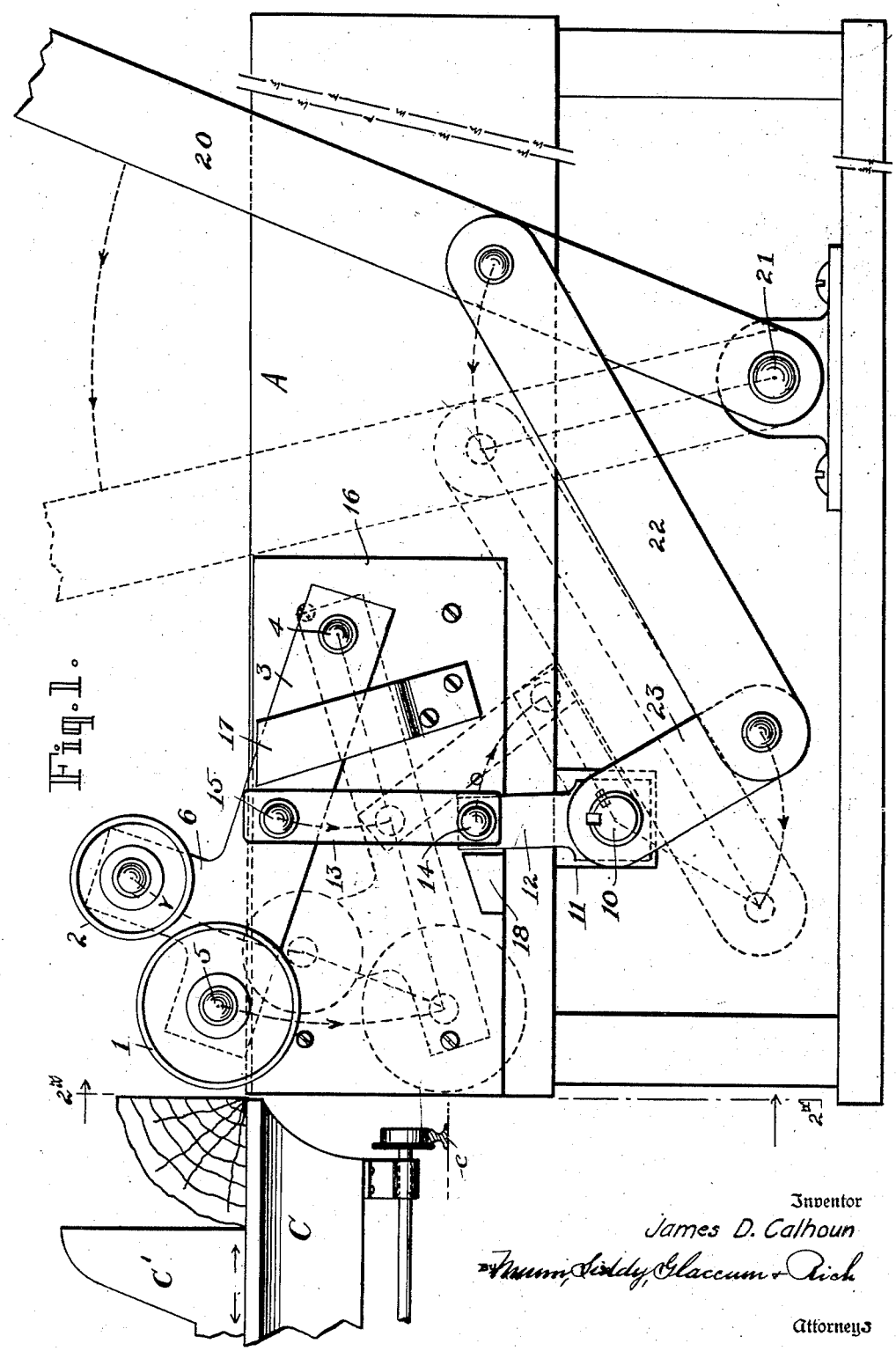
Figure 1 is a side elevation of an arrangement of parts exemplifying one embodiment of my invention.

In illustrating my invention I have shown associated parts of a saw mill of which the log deck is composed of spaced skid ways A and B the upper edges of which may be either horizontal, as shown, or inclined slightly towards their rear ends. Their forward ends are on a level with the platform of the reciprocating carriage C and terminate in vertical breasts adjacent the lateral edge of the carriage. The latter travels on a track c carrying the overhanging edges of the logs to be cut in a longitudinal path past the saw as will be understood. Positioning of the logs on the carriage is determined by knees C', one of which is shown, which are adjustable laterally to determine the thickness of successive cuts. This feature of adjustability may also be used to push a partly cut log or partially formed timber onto the log deck and it is in connection with such operations that the elements embodying my invention may also be used to turn or reverse the position of the log or timber after it has been first delivered to the carriage as will be further explained.

In carrying out my invention I provide pairs of rollers 1 and 2 in staggered relation, one above and to the rear of the other, and provide means for raising and lowering them so that they may be raised successively above the level of the deck. These rollers are preferably of different diameters, the larger one being located foremost with its forward edge adjacent the breast of the deck and the smaller one positioned in overlapping relation thereto and sufficiently in rear thereof so that when it is elevated it will engage a log behind the plane passing through the horizontal axis of the log and cause the latter to be rolled forwardly into the path of the larger roller which at this time likewise engages the log in rear of its axial center. Thus it will be seen that the larger roller as it continues to rise will push the log fully onto the carriage C.

The vertical movement of the rollers 1 and 2 I have found in practice may be most simply accomplished by mounting them on a pivoted arm 3 rotating about a center 4 well in rear of the deck breast and somewhat below its upper edge. As will be seen in Fig. 1 the center of rotation 5 of the larger roller is alined with the pivot 4 of the supporting arm while the smaller roller is journaled on an upward projection 6 of said arm thus providing an arrangement of parts whereby following the initial contact of the smaller roller with a log, its axis, as it continues its upward movement retreats slightly while the periphery of the roller continues to turn in contact with the log pushing it forwardly into the path of the larger roller.

The arrangement of the parts just described are duplicated on opposite sides of the log deck, as shown in Fig. 2, and are connected for simultaneous operation by a rock shaft 10 extending transversely beneath the skid ways and carried in bearings 11. Toggle connections extend from the ends of the shaft to the respective arms 3, comprising crank arms 12 keyed to the shaft and links 13 pivoted at 14 to the ends of said cranks and to the arms 3, at the points 15 midway of said arms. For convenience in mounting the latter they are pivoted on plates 16, fixed to the sides of the log deck, or skid ways. As an accessory each plate carries an arm 17 having an offset upper portion which forms a guide for the arms 3. Also on the lower edge of plate 16 is a fixed stop 18 which prevents the toggle from being overcast or breaking in a direction toward the left hand side as viewed in Fig. 1.

At the side of the machine most convenient to the sawyer and located sufficiently away from the side of the log deck is the manually operated lever 20 by means of which he controls the vertical movement of the pairs of rollers. This lever is pivoted at its lower end 21 to the flooring and carries a link 22 the forward end of which is pivoted to a crank arm 23 rigidly connected to the end of shaft 10. The extremes of movement of the control lever and the resultant action effected through the toggle connections is shown by the full and dotted lines in Fig. 1.

For clarity of illustration I have shown a simplified arrangement of the parts in Figs. 1 and 2 which it will be understood may be changed to meet the rugged nature of the work to be performed without departing from the spirit of the invention disclosed. As an example I have shown in Fig. 3 how the pairs of rollers 1 and 2 may be mounted between parallel arms 3ª and 3ᵇ both of which are pivoted at their rear ends on a stud 4ª carried by the plate 16. If desired each of these arms may be connected by separate links 13ª—13ᵇ the lower ends of which straddle the fixed member 12 of the toggle carried by the shaft 10.

It will be appreciated that when the sawyer desires to turn a log from which a preliminary slab cut, or cuts, has been taken and similarly if he wishes to turn a stick of timber, he can push the same by means of the knees C' onto the deck. In such instances the turning rollers may be fully depressed, as shown in dotted lines in Fig. 1, or the sawyer, by means of lever 20, may only depress the larger roller leaving the smaller one standing above the surface of the deck and acting as a stop. Another adjustment which the sawyer may effect is to position the periphery of the larger roller part way above the deck. In this position a log or timber being pushed onto the deck will cant upwardly so that its turning over may be quickly accomplished by only a slightly further upward movement of said roller which the sawyer times in relation to the retraction of the carriage knees.

I claim:

1. An apparatus for use with a reciprocating log carriage comprising a saw mill log deck having spaced skid ways terminating in breasts adapted to be positioned adjacent the carriage, arms pivoted on the sides of said ways each carrying a pair of rollers mounted for rotation about horizontal axes substantially parallel to the breast of the deck, one roller of each pair being located with its forward edge adjacent the skid way breast, the other arranged above and in rear of the first roller with its forward edge overlapping a portion of said first roller, said first roller being vertically movable to elevate a log and impel it from the deck onto the carriage, a manually operated lever located at one side of one of the skid ways and toggle connections between it and said pivoted arms comprising an oscillatory shaft extending transversely beneath the skid ways.

2. An apparatus for use with a reciprocating log carriage comprising a saw mill log deck having spaced skid ways terminating in breasts adapted to be positioned adjacent the carriage and arms pivoted on the sides of said ways each carrying a pair of rollers mounted for rotation about horizontal axes substantially parallel to the breast of the deck, one roller of each pair being located with its forward edge adjacent the skid way breast, the other arranged above and in rear of the first roller with its forward edge overlapping a portion of said first roller in rear of said breasts, said first roller being vertically movable to elevate a log and impel it from the deck onto the carriage, an oscillatory shaft extending transversely beneath the skid ways, toggle connections between the shaft and said arms and means for rocking the shaft embodying a lever controllable by a sawyer and located at one side of one of the skid ways.

JAMES D. CALHOUN.

REFERENCES CITED

The following references are of record in the file of this patent:

UNITED STATES PATENTS

| Number | Name | Date |
|---|---|---|
| 300,405 | Stetson | June 17, 1884 |
| 561,396 | Hicks | June 2, 1896 |
| 671,998 | Gay | Apr. 16, 1901 |
| 944,829 | Stoner | Dec. 28, 1909 |
| 989,413 | Porter | Apr. 11, 1911 |
| 995,300 | Sneed | June 13, 1911 |
| 2,401,500 | Ockfen | June 4, 1946 |